(12) United States Patent
Ceyer et al.

(10) Patent No.: US 7,829,035 B2
(45) Date of Patent: Nov. 9, 2010

(54) OXIDATION CATALYST

(75) Inventors: Sylvia T. Ceyer, Cambridge, MA (US); David L. Lahr, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 746 days.

(21) Appl. No.: 11/335,865

(22) Filed: Jan. 19, 2006

(65) Prior Publication Data
US 2007/0166220 A1    Jul. 19, 2007

(51) Int. Cl.
    B01D 50/00    (2006.01)
(52) U.S. Cl. .................................... 422/177
(58) Field of Classification Search ............... 423/247; 502/344; 422/168, 177, 180, 211, 212
See application file for complete search history.

(56) References Cited

U.S. PATENT DOCUMENTS

| | | |
|---|---|---|
| 3,719,739 A | 3/1973 | Thompson |
| 3,768,982 A | 10/1973 | Kitzner et al. |
| 3,925,259 A | 12/1975 | Kane |
| 3,928,235 A | 12/1975 | Goodell |
| 3,928,241 A | 12/1975 | Niimi et al. |
| 3,940,329 A | 2/1976 | Wilhelm |
| 4,140,655 A | 2/1979 | Chabot et al. |
| 4,193,793 A | 3/1980 | Cheung |
| 4,376,374 A | 3/1983 | Bothwell |
| 4,384,891 A | 5/1983 | Barnabé |
| 4,465,654 A | 8/1984 | Faschingbauer |
| 4,698,324 A | 10/1987 | Haruta et al. |
| 4,937,219 A | 6/1990 | Haruta et al. |
| 4,976,929 A | 12/1990 | Cornelison et al. |
| 5,051,394 A | 9/1991 | Haruta et al. |
| 5,145,822 A | 9/1992 | Falke et al. |
| 5,319,929 A | 6/1994 | Cornelison et al. |
| 5,413,984 A | 5/1995 | Marecot et al. |
| 5,422,085 A | 6/1995 | Bell et al. |
| 5,500,198 A | 3/1996 | Lui et al. |
| 5,626,689 A | 5/1997 | Taylor, Jr. |
| 5,688,609 A | 11/1997 | Rostrup-Nielsen et al. |
| 5,768,888 A | 6/1998 | Matros et al. |
| 5,789,337 A | 8/1998 | Haruta et al. |
| 5,899,678 A | 5/1999 | Thomson et al. |
| 5,965,098 A | 10/1999 | Boegner et al. |
| 5,997,835 A | 12/1999 | Hyldtoft et al. |
| 6,365,543 B1 | 4/2002 | Schmidt et al. |
| 6,548,446 B1 | 4/2003 | Koermer et al. |
| 6,566,573 B1 | 5/2003 | Bharadwaj et al. |
| 6,585,940 B2 | 7/2003 | Abe et al. |
| 6,602,355 B2 | 8/2003 | Alstrup et al. |
| 6,624,116 B1 | 9/2003 | Bharadwaj et al. |
| 6,692,713 B2 | 2/2004 | Grunwaldt et al. |
| 6,696,389 B1 | 2/2004 | Boegner et al. |
| 6,699,448 B2 | 3/2004 | Wu et al. |
| 6,773,485 B2 | 8/2004 | Doubrava et al. |
| 6,774,080 B2 | 8/2004 | LaBarge et al. |
| 6,780,386 B1 | 8/2004 | Fukunaga et al. |
| 6,881,703 B2 | 4/2005 | Cutler et al. |
| 2002/0022568 A1 | 2/2002 | Mackay et al. |
| 2002/0146614 A1 | 10/2002 | Norskov et al. |
| 2003/0060655 A1 | 3/2003 | Hayashi et al. |
| 2004/0005270 A1 | 1/2004 | Xu et al. |
| 2004/0137288 A1 | 7/2004 | Morgenstern |
| 2004/0175327 A1 | 9/2004 | Hagemeyer et al. |
| 2005/0022450 A1 | 2/2005 | Tan et al. |

FOREIGN PATENT DOCUMENTS

| | | |
|---|---|---|
| EP | 0 884 274 B1 | 12/1998 |
| EP | 1 378 290 A1 | 1/2004 |
| EP | 1 486 577 A1 | 12/2004 |
| JP | 8295502 | 11/1996 |
| WO | WO 00/03579 A2 | 1/2000 |
| WO | WO 00/05168 A1 | 2/2000 |
| WO | WO 2004052536 A1 | 6/2004 |

OTHER PUBLICATIONS

Barth, J.V. et al., *Surface Science* 2002, 513, 359.
Chen, M. et al, *Science* 2004, 306, 252-255.
Guzman, J. et al., *J. Am. Chem. Soc.* 2004, 126, 2672-2673.
Guzman, J. et al. *J. Am. Chem. Soc.* 2005, 127, 3286-7.
Haruta, M. et al., *J. Catal.* 1989, 115, 301-309.
Holmblad, P. et al., *J. Chem. Phys.* 1996, 104, 7289-7295.
Jacobsen, K. W. et al., *Phys. Rev. Lett.* 1995, 75, 489-492.
Stiehl, J. D. et al., *J. Am. Chem. Soc.* 2004, 126, 13574-5.

(Continued)

Primary Examiner—Tom Duong
(74) Attorney, Agent, or Firm—Wolf, Greenfield & Sacks, P.C.

(57) ABSTRACT

The present invention generally relates to catalyst systems and methods for oxidation of carbon monoxide. The invention involves catalyst compositions which may be advantageously altered by, for example, modification of the catalyst surface to enhance catalyst performance. Catalyst systems of the present invention may be capable of performing the oxidation of carbon monoxide at relatively lower temperatures (e.g., 200 K and below) and at relatively higher reaction rates than known catalysts. Additionally, catalyst systems disclosed herein may be substantially lower in cost than current commercial catalysts. Such catalyst systems may be useful in, for example, catalytic converters, fuel cells, sensors, and the like.

16 Claims, 4 Drawing Sheets

OTHER PUBLICATIONS

Valden, M. et al., *Science* 1998, 281, 1647-1650.

Besenbacher, F. et al., "*Design of a Surface Alloy Catalyst for Steam Reforming*," Science 1998, 279, 1913-1915.

Kimble, M. L. et al., "*Reactivity of Atomic Gold Anions toward Oxygen and the Oxidation of CO: Experiment and Theory*," Journal of the American Chemical Society 2004, vol. 126, No. 8, 2526-2535.

Vestergaard, E. K. et al., "*Adsorbate-Induced Alloy Phase Separation: a direct view by high-pressure scanning tunneling microscopy*," Physical Review Letters 2005, vol. 95, No. 12, 126101/1-126101/4.

Written Opinion of the International Search Report for International Application No. PCT/US2007/001308, issued on Sep. 25, 2007.

OXIDATION CATALYST

FEDERALLY SPONSORED RESEARCH

This invention was made with government support under awarded by the Department of Energy under Grant Number DE-FG02-89ER14035. The government has certain rights in the invention.

FIELD OF THE INVENTION

The present invention relates to catalyst systems and methods for oxidation of carbon monoxide.

BACKGROUND OF THE INVENTION

Catalytic converters have been widely used in automobile exhausts to the reduce the emission of harmful gases, such as carbon monoxide and hydrocarbons, into the atmosphere. Active catalyst materials placed within the catalytic converter may be used to chemically convert toxic fumes to relatively less hazardous gases. For example, one important chemical reaction that takes place within the catalytic converter is the catalytic oxidation of carbon monoxide (CO) to produce carbon dioxide ($CO_2$). In addition to the reduction of CO emission to address environmental concerns, the mitigation of CO gas can also aid other processes within the catalytic converter that may be hampered in the presence of CO, such as the catalytic combustion of hydrocarbon gases.

While many commercial catalysts exist, such as platinum—rhodium alloys or alumina-supported palladium metal, improvements are still needed. For example, in a typical internal combustion engine more than half of total hydrocarbon emissions (50-90%) occurs during the initial cold starting of the engine (e.g., when the catalyst is below 600 K). Current commercial catalysts are unable to catalytically oxidize CO at such low temperatures. The CO oxidation often proceeds at a measurable rate only after the catalyst has been heated to 600 K by, for example, the exhaust gases, prior to which time a significant portion of hazardous CO-containing fumes may be released into the atmosphere. Furthermore, current CO oxidation catalysts are typically high in cost due to the use of materials such as platinum, rhodium, and palladium in relatively high amount, often in the form of metallic particles having a diameter of about 10 nm.

Gold nanoparticles have been suggested as an alternative to present CO oxidation catalysts. For example, Haruta (Haruta et al., *J. Catal.* 1989, 115, 301) demonstrated that gold clusters supported on transition metal oxides such as $TiO_2$ perform the catalytic CO oxidation at temperatures of about 200 K. Many other prior investigators have dealt with the catalytic oxidation of CO, yet it is believed that these investigations, including the result of Haruta, are not optimal when compared with that of the present invention.

Accordingly, improved catalysts for CO oxidation are needed.

SUMMARY OF THE INVENTION

Figure 1:
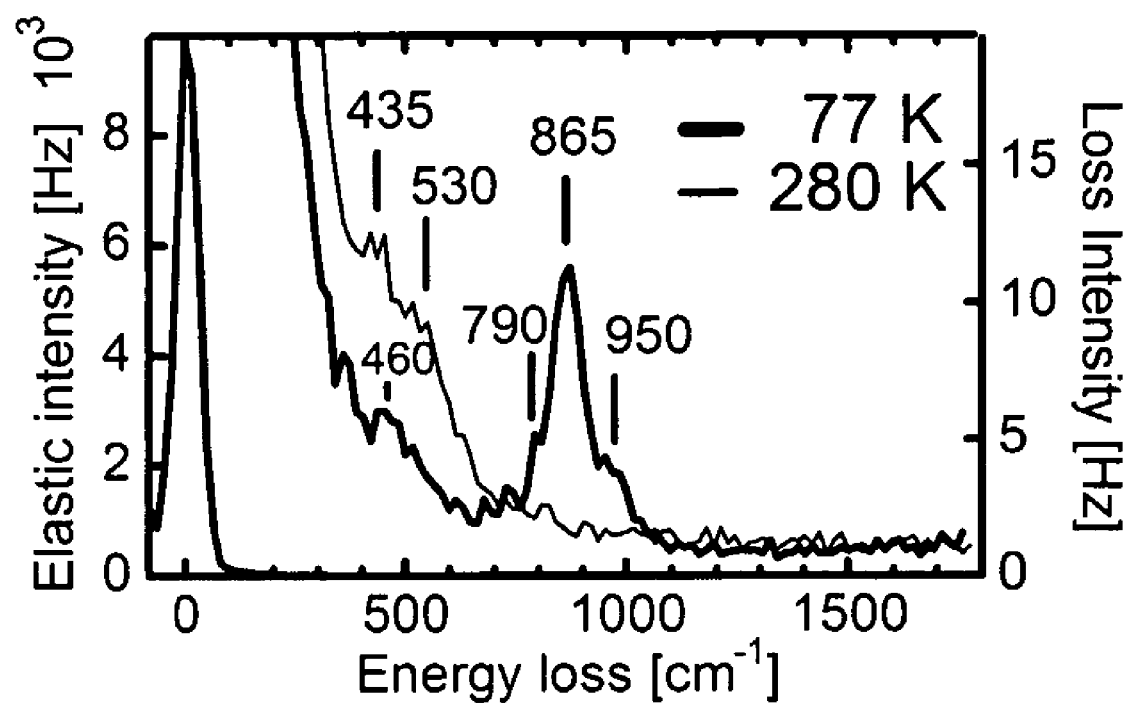
FIG. 1 shows the specular HREEL spectrum (at both 77 K and at 280 K) for a gold/nickel surface alloy which has been exposed to dioxygen.

The present invention provides catalyst compositions, methods, and systems for oxidation of carbon monoxide.

In one aspect, the invention provides systems. In one embodiment, the invention provides a catalyst system for oxidation of carbon monoxide, comprising a reaction chamber constructed and arranged to be exposed to a source of carbon monoxide, the reaction chamber comprising a catalyst composition, the catalyst composition comprising a surface, wherein the surface comprises a monolayer of atoms containing $7.4 \times 10^6$ or less gold atoms per $\mu m^2$.

The present invention also provides a catalyst system for oxidation of carbon monoxide, comprising a reaction chamber constructed and arranged to be exposed to a source of carbon monoxide, the reaction chamber comprising a catalyst composition, the catalyst composition comprising a surface, wherein the surface comprises a monolayer of atoms comprising 40% or less gold atoms.

The present invention also provides a catalyst system for oxidation of carbon monoxide, comprising a reaction chamber constructed and arranged to be exposed to a source of carbon monoxide, the reaction chamber comprising a catalyst composition, the catalyst composition comprising a base material and gold atoms primarily positioned in an exposed state at the surface, wherein at least 90% of the gold atoms in the catalyst composition are so exposed at the surface.

The present invention also provides a catalyst system for oxidation of carbon monoxide, comprising a reaction chamber constructed and arranged to be exposed to a source of carbon monoxide, the reaction chamber comprising a catalyst composition, the catalyst composition comprising a base material and dispersed material, wherein at least 90% of atoms of the dispersed material do not contact other atoms of the dispersed material.

Another aspect of the present invention relates to a method for oxidation of carbon monoxide, comprising introducing a gas comprising carbon monoxide into a reaction chamber constructed and arranged to be exposed to a source of carbon monoxide, the reaction chamber comprising a catalyst composition, and performing the oxidation with at least a 50% level of conversion of carbon monoxide to carbon dioxide at a temperature of 200 K or less.

The present invention also relates to a method for oxidation of carbon monoxide, comprising contacting a catalyst with a gas comprising carbon monoxide, and causing adsorption of a dioxygen species at a surface of the catalyst and reaction of the adsorbed dioxygen species with carbon monoxide to form carbon dioxide at a temperature of 200 K or less.

DETAILED DESCRIPTION

The present invention generally relates to catalyst systems and methods for oxidation of carbon monoxide. The invention involves catalyst compositions which may be advantageously altered by, for example, modification of the catalyst surface to enhance catalyst performance. In general, the invention involves the discovery that formation of a catalyst involving one of a set of particular metals in a very small quantity as part of the surface of a base or support material can provide a particularly effective CO oxidation catalyst. The metal may be provided as a part of a monolayer or approximate molecular monolayer of the support surface and/or the metal may be dispersed within the surface of the base material. A small amount of metal within the base material provides both a more effective catalyst and a lower-cost catalyst than presently available catalysts.

In one aspect, the invention includes a base material and, exclusively or primarily at a surface of the material, a metal such as gold or tin in a small amount (where the base material, itself, is not gold or tin, respectively). In one set of embodiments, the base material has a crystal structure and the metal is provided in atomic form (in contrast, for example, to particles or clusters or metal) where the metal atoms replace atoms in the crystal structure of the base material and thereby do not significantly alter the crystal structure at the surface. While, in this embodiment, particles or clusters of the metal can also exist at the surface, the existence of such particles or clusters are not necessary and it is believed do not contribute to or enhance the performance of the catalyst. The metal atoms at the surface of the base material of the catalyst are present in relatively dilute form. Small quantity of metal, generally dispersed atomically rather than in cluster or particle form, and located primarily or exclusively at the surface provide unexpected CO oxidation catalyst properties in accordance with the invention. These and other arrangements are described more thoroughly below. Catalyst systems of the present invention may be capable of performing the oxidation of carbon monoxide at relatively lower temperatures (e.g., 200 K and below) and at relatively higher reaction rates than known catalysts. Additionally, catalyst systems disclosed herein may be substantially lower in cost than current commercial catalysts. Such, catalyst systems may be useful in, for example, catalytic converters, fuel cells, sensors, and the like.

The present invention provides catalyst compositions for oxidation of CO that may include a surface or surface monolayer of atoms modified to improve catalyst performance, particularly at room temperature (e.g., 300 K) and below. In some embodiments, at least a portion of the surface monolayer of a base material of the catalyst composition may be modified with other atoms dispersed within the surface. For example, atoms within the surface monolayer may be randomly replaced with atoms of a dispersed material, such as gold or tin, for example. As used herein, the material used to modify the surface monolayer of a base material may be referred to as the "dispersed material" and the underlying material may be referred to as the "base material." The "surface" or "surface monolayer" refers to the outermost atomic monolayer of a supported or unsupported base material.

In one set of embodiments, the catalyst composition comprises gold atoms as the dispersed material, on or within the monolayer on the surface of the catalyst composition. For example, the catalyst compositions may comprise a surface monolayer of atoms comprising about $7.4 \times 10^6$ or less gold atoms per $\mu m^2$. In another embodiment, the catalyst composition comprises a surface monolayer of atoms comprising about $5.6 \times 10^6$ or less gold atoms per $\mu m^2$. In another embodiment, the catalyst composition comprises a surface monolayer of atoms comprising about $3.7 \times 10^6$ or less gold atoms per $\mu m^2$. In another embodiment, the catalyst composition comprises a surface monolayer of atoms comprising about $2.8 \times 10^6$ or less gold atoms per $\mu m^2$.

In other embodiments, the surface monolayer of the catalyst composition comprises a particularly low level of gold atoms, the remainder being atoms of base material or other material. In one embodiment, the surface monolayer of the catalyst composition comprises 40% or less gold atoms. In another embodiment, the surface monolayer of the catalyst composition comprises 30% or less gold atoms. In another embodiment, the surface monolayer of the catalyst composition comprises 20% or less gold atoms. In another embodiment, the surface monolayer of the catalyst composition comprises 15% or less gold atoms. In another set of embodiments, gold atoms, in each of the embodiments described above, are replaced with tin or another metal as described herein. It is also to be understood that where gold atoms are described herein in connection with the catalyst, tin or any of the other described metals can be used in place of gold.

In a particular embodiment, the base material of the catalyst composition comprises nickel. For example, the surface monolayer of a nickel catalyst, or portions thereof, may be modified by the replacement of nickel atoms within the surface monolayer with gold atoms. In a particular embodiment, the catalyst composition comprises nickel having a surface monolayer comprising 30% or less gold atoms.

In a set of embodiments, atoms of the dispersed material are generally positioned at the surface of the base material. In one embodiment, the catalyst composition comprises the base material and gold atoms primarily positioned in an exposed state at the surface, wherein at least 90% of the gold atoms in the material are so exposed at the surface. This may be advantageous in embodiments wherein atoms of the dispersed material positioned below the surface of the base material are not capable of enhancing catalyst performance. In such cases, the extraneous dispersed material below the surface may unnecessarily increase the cost of the catalyst. However, in embodiments of the present invention, because a substantial majority of dispersed material atoms (e.g., gold atoms) are present at the surface of the base material, a minimal amount of dispersed material may be used for modification of the catalyst composition, decreasing the overall cost of the catalyst system.

Additionally, atoms of the dispersed material are non-agglomerated in most embodiments. That is, the catalyst composition may comprise a base material and a dispersed material wherein at least 90% of atoms of the dispersed material do not contact other atoms of the dispersed material to form agglomerates (e.g., dimers, trimers, clusters, particles, etc.). In one embodiment, the dispersed material comprises gold atoms, wherein at least 90% of the gold atoms at the surface of the catalyst are exposed at the surface and do not contact other gold atoms. In some embodiments, the inclusion of higher percentages of dispersed material (e.g., greater than 40% of the surface monolayer) within the surface monolayer may result in the formation of clusters or islands of the dispersed material, which may disadvantageously alter the surface monolayer of the catalyst composition (e.g., alter the original crystal structure of the base material). The formation of, for example, gold agglomerates at the surface of the catalyst composition may be inhibited by controlling the amount of gold atoms used to modify the surface monolayer.

The amount of dispersed material (e.g., gold atoms) used to modify the surface monolayer of the catalyst composition may also affect catalyst performance. For example, the surface monolayer of the catalyst composition may preferably comprise at least the minimum amount of gold atoms necessary to effectively perform the low temperature oxidation of CO (e.g., below 200 K). However, as mentioned above, the use of higher amounts of dispersed material may lead to undesirable formation of agglomerates. In one embodiment, the gold atoms are present in the catalyst composition in an amount of $2.7 \times 10^{-5}\%$ or less by weight, based on the base material. In another embodiment, the gold atoms are present in an amount of $2.0 \times 10^{-5}\%$ or less by weight, based on the base material. In another embodiment, the gold atoms are present in an amount of $1.3 \times 10^{-5}\%$ or less by weight, based on the base material. In another embodiment, the gold atoms are present in an amount of $1.0 \times 10^{-5}\%$ or less by weight, based on the base material.

In other embodiments, the surface monolayer is modified with the dispersed material such that an original crystal structure of the base material may be retained upon the modification. In some embodiments, modification of the surface monolayer of the base material results in a surface alloy, wherein the atoms being deposited randomly replace atoms of the surface monolayer, preserving the original crystal structure of the unmodified base material. In a particular embodiment, the catalyst composition comprises nickel and is modified with gold atoms such that gold atoms randomly replace nickel atoms, preserving the hexagonal, two-dimensional crystal structure of the unmodified nickel surface.

In a set of embodiments, catalyst systems of the present invention include a reaction chamber. As used herein, a "reaction chamber" refers to an apparatus within which the oxidation of carbon monoxide may take place. The reaction chamber may be constructed and arranged to be exposed to a source of carbon monoxide such that the carbon monoxide may be processed, for example, by catalytic oxidation, to form carbon dioxide. In some embodiments, the reaction chamber may comprise catalyst compositions as described herein positioned within the reaction chamber which may be exposed to the source of carbon monoxide. Examples of reaction chambers include, but are not limited to, catalytic converters, fuel cell systems, sensors, other chemical systems comprising the oxidation of CO, and the like. As used herein, a system "constructed and arranged to be exposed to a source of carbon monoxide" refers to a system provided in a manner to direct the passage of a gas, such as a gas that is or that includes carbon monoxide, over the catalyst composition positioned within the reaction chamber. The "source of carbon monoxide" may include any apparatus comprising carbon monoxide, any apparatus or material that may be used to produce carbon monoxide, and the like. A "gas comprising carbon monoxide" as used herein refers to gas or mixture of gases that may include CO and other components, such as molecular oxygen.

The base material may be any material with a surface monolayer of atoms capable of being modified by replacement of atoms within the surface monolayer with other atoms, such as gold, tin, other materials capable of oxidizing CO to $CO_2$, or the like. The base material may be catalytically active or inactive. In some embodiments, the base material is a catalytically active material. Some examples of suitable materials for the base catalyst include nickel, platinum, iron, aluminum, copper, combinations thereof, and the like. The base material may further comprise various support materials in combination with the catalytically active components of the composition. Examples of suitable support materials include ceramic or metallic supports, or combinations thereof, such as alumina, ceria, cordierite, mullite, titania, lanthania, heryllia, thoria, silica, magnesia, niobia, vanadia, zirconia, magnesium-stabilized zirconia, zirconia-stabilized alumina, yttrium-stabilized zirconia, calcium-stabilized zirconia, calcium oxide, other ceramics, other materials with low thermal expansion coefficients, and the like.

The support material may be prepared by numerous methods known to those of ordinary skill in the art. For example, a supported base catalyst can be prepared by coprecipitating mixed solutions of the components, impregnating the active catalyst materials (e.g., metals) on support material, or the like. The support material may also be formed into a shape required to suit a particular application, such as cellular honeycomb structures, other thin-walled substrates, pellets, and the like.

The dispersed material may be any material capable of catalytically oxidizing CO such that the catalyst performance is enhanced relative to the catalyst without the dispersed material. For example, gold and tin may be used as the dispersed material. In some embodiments, the dispersed material is preferably insoluble with respect to the base material such that a stable surface alloy may be formed. For example, a gold/nickel surface alloy may be formed by modification of the surface monolayer of a nickel catalyst with gold, which is not soluble in nickel, allowing the gold atoms to remain on the surface of the nickel catalyst during modification. Methods for modification of the surface monolayer of the catalyst compositions may include chemical and physical routes including chemical vapor deposition, pulsed laser deposition, sputtering, evaporation, molecular beam epitaxy, or other methods known to those of ordinary skill in the art.

Another aspect of the present invention provides methods for oxidation of carbon monoxide using the catalyst systems described above. For example, the catalytic oxidation of CO may involve the adsorption of a dioxygen species (e.g., molecular oxygen) onto a surface of the catalyst composition, followed by reaction of the adsorbed dioxygen species with CO to form $CO_2$ gas and an oxygen atom adsorbed to the surface of the catalyst composition. Typically, at lower temperatures, known CO oxidation catalysts may adsorb the dioxygen species on the surface of the catalyst and then dissociate the adsorbed species into oxygen atoms before the adsorbed dioxygen species is able to react directly with CO to form $CO_2$. The resulting oxygen atoms, adsorbed to the catalyst surface, may then require higher temperatures in order for reaction with CO to proceed. In order to carry out the CO oxidation at low temperature, catalyst systems of the present invention may be able to adsorb the dioxygen species intact, rather than dissociating into separate oxygen atoms, such that the adsorbed dioxygen species may directly react with CO to form $CO_2$.

When exposed to a gas comprising CO, catalyst systems of the present invention may perform catalytic oxidation of CO to $CO_2$ at relatively lower temperatures than commercial catalysts, which often require temperatures of 600 K or higher. In the present invention, methods for the catalytic oxidation of CO at low temperature (e.g., 200 K and below) may involve adsorption of a dioxygen species on the surface of the catalyst composition, followed by direct reaction of the adsorbed dioxygen species with CO, either in the gas phase or adsorbed on the surface of the catalyst, to form $CO_2$. At elevated temperatures, the remaining oxygen atoms adsorbed on the surface of the catalyst may also react with CO to form $CO_2$, reducing the possibility of oxide buildup on the surface of the catalyst composition, which may poison the working catalyst.

In one embodiment, the invention provides a method for oxidation of carbon monoxide wherein a catalyst composition as described herein is exposed to a gas comprising carbon monoxide, causing adsorption of a dioxygen species onto the surface of the catalyst and subsequent reaction of the adsorbed dioxygen species with carbon monoxide to form carbon dioxide at a temperature of 200 K or less. In one embodiment, reaction of the adsorbed dioxygen species with carbon monoxide to form carbon dioxide may occur at a temperature of 150 K or less. In another embodiment, reaction of the adsorbed dioxygen species with carbon monoxide to form carbon dioxide may occur at a temperature of 100 K or less. In another embodiment, reaction of the adsorbed dioxygen species with carbon monoxide to form carbon dioxide may occur at a temperature of 70 K or less.

In one embodiment, the invention provides a method for oxidation of carbon monoxide wherein a gas comprising carbon monoxide is introduced into a reaction chamber comprising a catalyst composition, such as those described above, and the oxidation is performed to at least a 50% level of conversion of carbon monoxide to carbon dioxide at a temperature of 200 K or less. In other embodiments, the oxidation is performed to at least a 50% level of conversion of carbon monoxide to carbon dioxide at a temperature of 150K or less, 100K or less, or 70K or less. In another set of embodiments, the oxidation is performed to at least a 90% level of conversion of carbon monoxide to carbon dioxide at a temperature of 200K or less, 150K or less, 100K or less, or 70K or less:

While catalyst systems of the invention may efficiently oxidize CO at temperatures of about 200 K or less, it should be understood that catalyst systems disclosed herein may also be useful at temperatures above 200 K, such as room temperature (about 300 K), for example. The unique ability of catalyst systems disclosed herein to perform catalytic CO oxidation at lower temperatures (e.g., about 200 K or less) than previously known may suggest that, in general, for catalyst systems of the present invention, the activation barrier for catalytic CO oxidation may be lower relative to other catalysts. As such, for a broad range of temperatures, the rate of CO oxidation and, hence, the efficiency of the catalyst may be relatively higher for catalyst systems disclosed herein when compared to other known catalysts.

In addition to the ability to perform the catalytic oxidation of CO at relatively lower temperatures (and consequently, at higher rates of reaction), another advantage of catalyst systems of the present invention may be a significant reduction in cost of the catalyst systems. For example, gold may be significantly less expensive than many metals used in current commercial catalysts, such as platinum and rhodium. Also, in catalyst compositions of the invention, gold may be present at less than a single monolayer of atoms on, for example, a nickel surface (e.g., about $7.4 \times 10^6$ or less gold atoms per $\mu m^2$, about 40% or less of atoms in the surface monolayer). In contrast, Pt, Rh, and Pd used in the present commercial catalysts are in the form of metallic particles about 10 nm in diameter.

EXAMPLE 1

Gold is deposited onto a nickel(111) crystal by chemical vapor deposition at 450 K and mounted in an ultrahigh vacuum chamber. Deposition of up to 0.3 ML Au does not result in an epitaxial overlayer or clusters. Instead, gold atoms randomly replace nickel atoms within the surface monolayer, resulting in a strongly bound surface alloy and preserving the hexagonal, two-dimensional structure of the unmodified nickel surface. High resolution electron energy loss spectroscopy (HREELS) verifies the absence of contaminants such as oxygen, sulfur and carbon. The gold coverage on the surface of the catalyst, measured by Auger spectroscopy, is calibrated by comparison to previous results.

EXAMPLE 2

Using the Au/Ni surface alloy from Example 1, the saturation coverage of dioxygen (e.g., molecular oxygen) is adsorbed on the 0.24 ML Au/Ni surface alloy at 77 K. FIG. 1 shows the specular HREEL spectrum (bold line) of dioxygen saturation coverage measured at 77 K on 0.24 ML Au/Ni (111) after heating to 280 K. Incident electron energy is 6.4 eV with a resolution of 55 $cm^{-1}$ fwhm. The vibrational spectrum of the adsorbed dioxygen layer in FIG. 1 indicates that the dioxygen species is adsorbed on the surface of the Au/Ni surface alloy intact. The feature at 865 $cm^{-1}$ may be assigned to the O—O stretch mode of an adsorbed dioxygen species whose bond axis may be parallel to the surface. Similar vibrational frequencies have been observed for molecular oxygen adsorbed on Pt(111), Ag, Pd(111), and Cu(111) and have been characterized as peroxo ($O_2^{-2}$) or superoxo ($O_2^{-1}$) species.[1] The smaller features at 790 $cm^{-1}$ and 950 $cm^{-1}$ indicate the presence of adsorbed dioxygen species at multiple sites. The feature at 460 $cm^{-1}$ may beassigned to the dioxygen-Au/Ni stretch vibrational mode, while the unlabeled feature at 320 $cm^{-1}$ indicates a nickel phonon mode.

Figure 2:
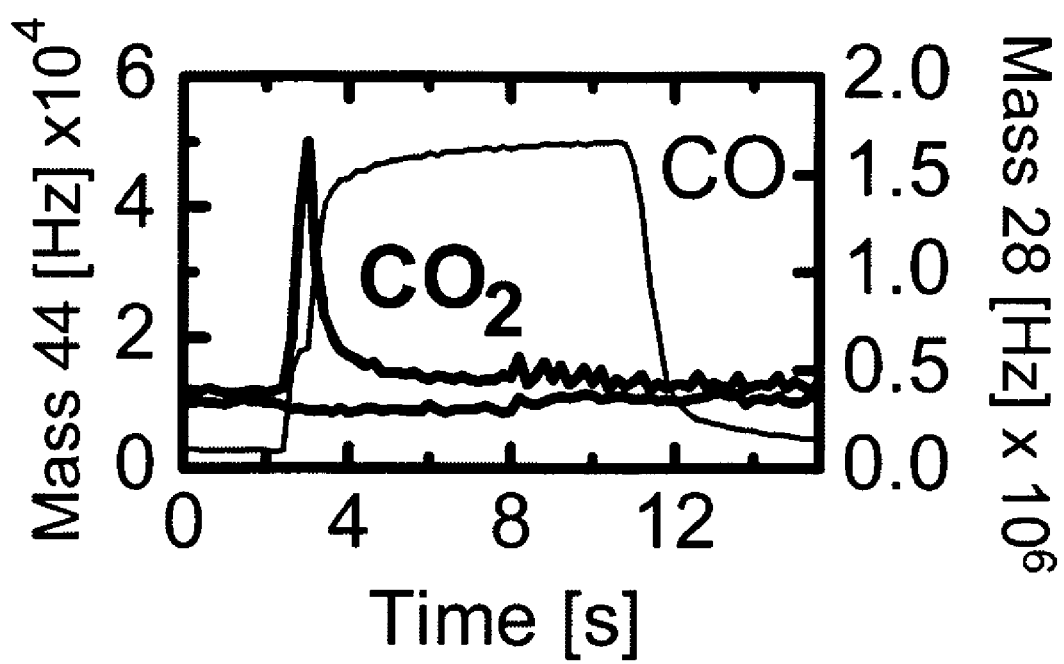
FIG. 2 shows the partial pressures of $CO_2$ and CO, plotted as raw count rate as a function of time, upon exposure of a dioxygen-covered Au/Ni surface alloy to CO at 77 K.

The Au/Ni surface alloy with adsorbed dioxygen, or the "dioxygen-covered Au/Ni surface alloy," is then heated at 2 K/s to 280 K, and the vibrational spectrum is measured at 77 K (FIG. 2). The features that had been assigned to the adsorbed dioxygen species (e.g., feature at 865 $cm^{-1}$, and corresponding minor features) are no longer present and two new features at 530 $cm^{-1}$ and 435 $cm^{-1}$ appear. Specifically, the feature at 865 $cm^{-1}$ begins to decrease in intensity after heating to 105 K and disappears after heating to 150 K. Given the absence of dioxygen desorption, this behavior may be attributed to dissociation of an adsorbed dioxygen species into separate, adsorbed oxygen atoms. Accordingly, two O—Ni stretch modes are observed. The 530 $cm^{-1}$ feature is assigned to oxygen atoms bound to nickel atoms that are adjacent to other nickel atoms, as this frequency is similar to that for oxygen atoms bound to nickel (580 $cm^{-1}$). The lower frequency feature at 435 $cm^{-1}$ is attributed to oxygen atoms bound to nickel atoms that are adjacent to gold atoms.

The adsorption of dioxygen was also carried out separately on an unmodified gold(111) surface and an unmodified nickel (111) surface. On the surface of Ni(111), the dioxygen species dissociates into separate oxygen atoms upon adsorption at temperatures as low as 8 K. On the surface of gold(111), the dioxygen species adsorbs neither molecularly (e.g. intact) nor dissociatively (e.g., as separated oxygen atoms) at or above 100 K.

EXAMPLE 3

A beam of thermal energy CO, with an incident flux of about 0.5 ML/s, is directed at the dioxygen-covered Au/Ni surface alloy at 77 K. FIG. 2 shows the plot of both the mass and partial pressures of $CO_2$ (bold, mass 44) and CO (mass 28), plotted as raw count rate as a function of time, measured upon exposure of the dioxygen-covered Au/Ni alloy at 77 K to CO at 2.5 s. The oxidation reaction is substantially complete after 1.5 seconds of exposure to CO, which is incident on the dioxygen-covered alloy surface for a total of 8 seconds. The $CO_2$ partial pressure is measured as a control experiment. As shown in FIG. 2, production of gas phase $CO_2$ coincides exactly with the introduction of CO. Given a dioxygen coverage of no more than 0.5 ML and an incident CO flux of about 0.5 ML/s, the conversion of CO to $CO_2$ is estimated to be between 50-100%.

Also, a control experiment is conducted wherein the dioxygen-covered Au/Ni alloy surface is rotated 180° such that the CO beam impinges on a portion of the Au/Ni alloy surface where dioxygen has not been adsorbed. As shown in FIG. 2, the partial pressure of $CO_2$ is plotted as a function of time of CO exposure. No $CO_2$ production is observed, indicating that the occurrence of $CO_2$ formation for the dioxygen-covered Au/Ni alloy surface can be attributed to CO reacting with the adsorbed dioxygen species at 77 K. Experiments carried out at 70 K indicate similar reactivity as at 77 K. Collision-induced desorption of the adsorbed dioxygen species by the incident CO is not observed.

It is difficult to determine if the CO molecules involved in the oxidation reaction are in the gas phase or are similarly adsorbed to the surface of the catalyst. However, no reaction is observed when a dioxygen beam is incident on a CO-covered Au/Ni(111) alloy.

Figure 3:
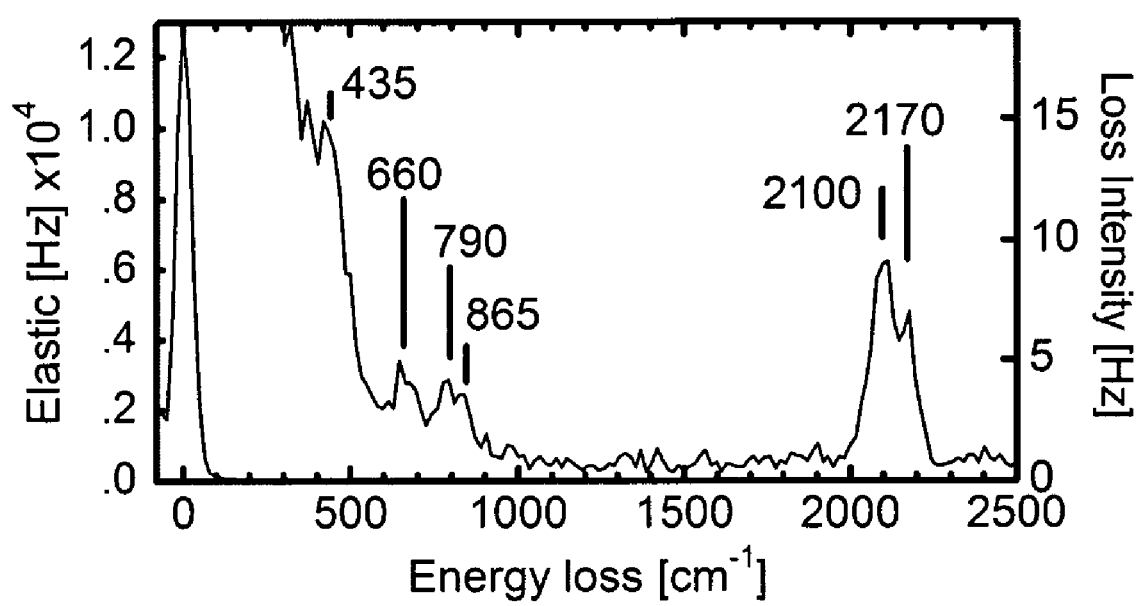
FIG. 3 shows the specular HREEL spectrum of a dioxygen-covered Au/Ni surface alloy upon exposure to a CO beam at 77 K.

FIG. 3 shows the specular HREEL spectrum of the dioxygen-covered surface alloy after exposure to a CO beam at 77 K. Two C=O stretch vibrational modes are observed at 2170 and 2100 $cm^{-1}$, along with the Au/Ni—CO stretch mode at 435 $cm^{-1}$ The features at 2170 and 2100 $cm^{-1}$ may represent CO bound to gold and nickel atoms, respectively. The O—O mode at 950 $cm^{-1}$ disappears while the 865 $cm^{-1}$ mode is greatly reduced in intensity. The decrease in the intensities of such features indicates that the adsorbed dioxygen species has reacted with CO to form $CO_2$, as observed in FIG. 2. The product remaining from this reaction is an adsorbed oxygen atom, as evidenced by the appearance of a new feature at 660 $cm^{-1}$. The oxygen atom product is believed to be bound to a gold atom because a frequency of 660 $cm^{-1}$ has been observed previously for the O—Au(111) stretch mode. The feature observed at 790 $cm^{-1}$ may represent unreacted, adsorbed dioxygen.

Figure 4:
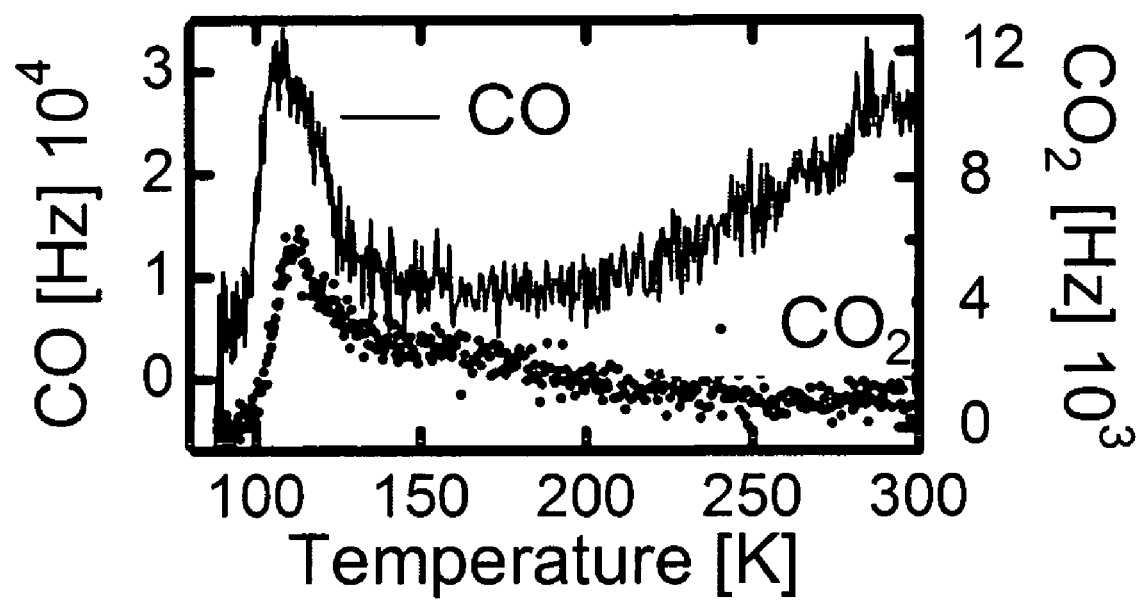
FIG. 4 shows the plot of dioxygen and CO partial pressures versus temperature as a dioxygen-covered Au/Ni surface alloy is heated after exposure to a CO beam at 77 K.

The alloy surface represented in the spectrum of FIG. 3 and a dioxygen-covered alloy surface that has been moved out of the direct path of the CO beam are heated at 2 K/s while the partial pressures at masses 44 (for $CO_2$) and 28 (for CO) are monitored. The difference between these two traces is calculated, and then the contribution to the mass 28 signal from the dissociative ionization of $CO_2$ is subtracted from the CO trace. The results are plotted as thermal desorption traces in FIG. 4, which shows the plot of $O_2$ and CO partial pressures versus temperature as the dioxygen-covered alloy is heated at 2 K/s after exposure to a CO beam at 77 K. Rapid production of gas phase $CO_2$ is clearly observed between 105-125 K, along with CO desorption. Production of $CO_2$ occurs in the same temperature range at which adsorbed dioxygen dissociates. This observation suggests that formation of $CO_2$ occurs between CO and a "hot" O atom, as proposed previously in cases where the temperature of $CO_2$ production is the same temperature at which $O_2$ dissociates. As used herein, a "hot" atom refers to an atom, produced by bond dissociation, which has not yet equilibrated with the surface. The CO desorption between 105-125 K is not observed in the absence of adsorbed dioxygen. Therefore, this desorption is a consequence of weaker CO binding in the presence of adsorbed dioxygen. Desorption of CO above 250 K, with a maximum desorption rate between 300-310 K not shown in FIG. 4, is similar to that observed in the absence of adsorbed oxygen. The high CO desorption rate relative to $CO_2$ production may be a result of performing the oxidation reaction with an excess of CO.

Above 125 K, $CO_2$ is produced slowly. A vibrational spectrum measured after raising the temperature to 280 K shows that the oxygen atom feature at 660 $cm^{-1}$ and the CO feature at 2170 $cm^{-1}$ disappear, suggesting that the CO and adsorbed oxygen atoms that react above 125 K are bound to the gold atoms. The intensity of the CO feature at 2100 $cm^{-1}$ remains undiminished after heating to 280 K. Adsorbed oxygen atoms bound to nickel atoms are also present after heating to 280 K, as indicated by the presence of weak intensity between 435-530 $cm^{-1}$. Dioxygen desorption is not observed. Heating the surface to 900 K results in no additional desorption of $CO_2$. It should also be noted that CO exposure of the alloy surface covered with atomically adsorbed oxygen, represented by the spectrum labeled 280 K in FIG. 1, does not result in reaction at any temperature. That is, oxygen atoms adsorbed on Ni atoms and identified by the 435-530 $cm^{-1}$ features are unreactive with CO.

As demonstrated above, the nanoscale size of gold clusters and its associated quantum size effect may not be a necessary feature to enable low temperature CO oxidation. Rather, formation of a surface alloy between gold and nickel on a Au/Ni surface stabilizes adsorption of an intact dioxygen species that is identified spectroscopically as a reactant with CO at low temperatures (e.g., 70 K). The low temperature catalytic oxidation of CO using a Au/Ni surface alloy may occur by at least three distinct mechanisms. For example, at 70 K an adsorbed dioxygen species reacts with CO. At elevated temperatures (e.g., 105-125 K), $CO_2$ production coincides with dissociation of the adsorbed dioxygen species. At high temperatures (e.g., 125 K or higher), CO bound to gold atoms may react with oxygen atoms bound to gold atoms.

The examples described herein were performed in ultra-high vacuum conditions using an unsupported catalyst. However, it should be understood by those of ordinary skill in the art that both unsupported and supported catalyst systems of the invention may also perform in other conditions, such as atmospheric conditions.

This invention is not limited in its application to the details of construction and the arrangement of components set forth in the description. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed:

1. A catalyst system for oxidation of carbon monoxide, comprising:
    a reaction chamber constructed and arranged to be exposed to a source of carbon monoxide and a source of a dioxygen species, the reaction chamber comprising a catalyst composition,
    the catalyst composition comprising a base material and a surface, wherein the surface comprises a surface monolayer of atoms comprising gold atoms present in an amount of no more than about $7.4 \times 10^6$ gold atoms per $\mu m^2$,
    wherein the gold atoms are present in the catalyst composition in an amount of $2.7 \times 10^{-5}$% or less by weight, based on the base material, and
    wherein the catalyst composition has a crystal structure substantially similar to a crystal structure of a comparative composition that is essentially identical to the catalyst composition, but wherein the comparative composition lacks gold atoms.

2. A catalyst system as in claim 1, wherein the surface monolayer of atoms comprises gold atoms present in an amount of no more than about $5.6 \times 10^6$ gold atoms per $\mu m^2$.

3. A catalyst system as described in claim 1, wherein the surface monolayer of atoms comprises gold atoms present in an amount of no more than about $3.7 \times 10^6$ gold atoms per $\mu m^2$.

4. A catalyst system as described in claim 1, wherein the surface monolayer of atoms comprises gold atoms present in an amount of no more than about $2.8 \times 10^6$ gold atoms per $\mu m^2$.

5. A catalyst system as described in claim 1, wherein the catalyst composition further comprises nickel.

6. A catalyst system for oxidation of carbon monoxide, comprising:
a reaction chamber constructed and arranged to be exposed to a source of carbon monoxide and a source of a dioxygen species, the reaction chamber comprising a catalyst composition,
the catalyst composition comprising a base material and a surface, wherein the surface comprises a surface monolayer of atoms comprising gold atoms present in an amount of no more than 40%,
wherein the gold atoms are present in the catalyst composition in an amount of $2.7 \times 10^{-5}\%$ or less by weight, based on the base material, and
wherein the catalyst composition has a crystal structure substantially similar to a crystal structure of a comparative composition that is essentially identical to the catalyst composition, but wherein the comparative composition lacks gold atoms.

7. A catalyst system as in claim 6, wherein the surface monolayer of atoms comprises gold atoms present in an amount of no more than about 30%.

8. A catalyst system as described in claim 6, wherein the surface monolayer of atoms comprises gold atoms present in an amount of no more than 20%.

9. A catalyst system as described in claim 6, wherein the surface monolayer of atoms comprises gold atoms present in an amount of no more than 15%.

10. A catalyst system as described in claim 6, wherein the catalyst composition further comprises nickel.

11. A catalyst system for oxidation of carbon monoxide, comprising:
a reaction chamber constructed and arranged to be exposed to a source of carbon monoxide and a source of a dioxygen species, the reaction chamber comprising a catalyst composition,
the catalyst composition comprising a base material and gold atoms primarily positioned in an exposed state at the surface, wherein at least 90% of the gold atoms in the catalyst composition are so exposed at the surface,
wherein the gold atoms are present in an amount of $2.7 \times 10^{-5}\%$ or less by weight, based on the base material, and
wherein the catalyst composition has a crystal structure substantially similar to a crystal structure of a comparative composition that is essentially identical to the catalyst composition, but wherein the comparative composition lacks gold atoms.

12. A catalyst system as in claim 11, wherein at least 90% of the gold atoms in the catalyst composition do not contact other gold atoms.

13. A catalyst system as described in claim 11, wherein the gold atoms are present in an amount of $2.0 \times 10^{-5}\%$ or less by weight, based on the base material.

14. A catalyst system as described in claim 11, wherein the gold atoms are present in an amount of $1.3 \times 10^{-5}\%$ or less by weight, based on the base material.

15. A catalyst system as described in claim 11, wherein the gold atoms are present in an amount of $1.0 \times 10^{-5}\%$ or less by weight, based on the base material.

16. A catalyst system as described in claim 11, wherein the catalyst composition further comprises nickel.

* * * * *

UNITED STATES PATENT AND TRADEMARK OFFICE
CERTIFICATE OF CORRECTION

| | | |
|---|---|---|
| PATENT NO. | : 7,829,035 B2 | Page 1 of 1 |
| APPLICATION NO. | : 11/335865 | |
| DATED | : November 9, 2010 | |
| INVENTOR(S) | : Sylvia T. Ceyer | |

It is certified that error appears in the above-identified patent and that said Letters Patent is hereby corrected as shown below:

Please delete the paragraph titled 'FEDERALLY SPONSORED RESEARCH' encompassing column 1, lines 5-8:

"This invention was made with government support under awarded by the Department of Energy under Grant Number DE-FG02-89ER14035. The government has certain rights in the invention."

and replace with:

--This invention was made with government support under Grant Nos. DE-FG02-89ER14035 and DE-FG02-05ER15665 awarded by the Department of Energy. The government has certain rights in the invention.--

Signed and Sealed this
Thirtieth Day of October, 2012

David J. Kappos
*Director of the United States Patent and Trademark Office*